Feb. 11, 1964  S. H. BINGHAM  3,120,821
TRANSPORTATION TRUCK AND VEHICLE

Original Filed June 30, 1961  2 Sheets-Sheet 1

INVENTOR.
SIDNEY H. BINGHAM
BY *Darby & Darby*
ATTORNEYS

Feb. 11, 1964     S. H. BINGHAM     3,120,821
TRANSPORTATION TRUCK AND VEHICLE
Original Filed June 30, 1961     2 Sheets-Sheet 2
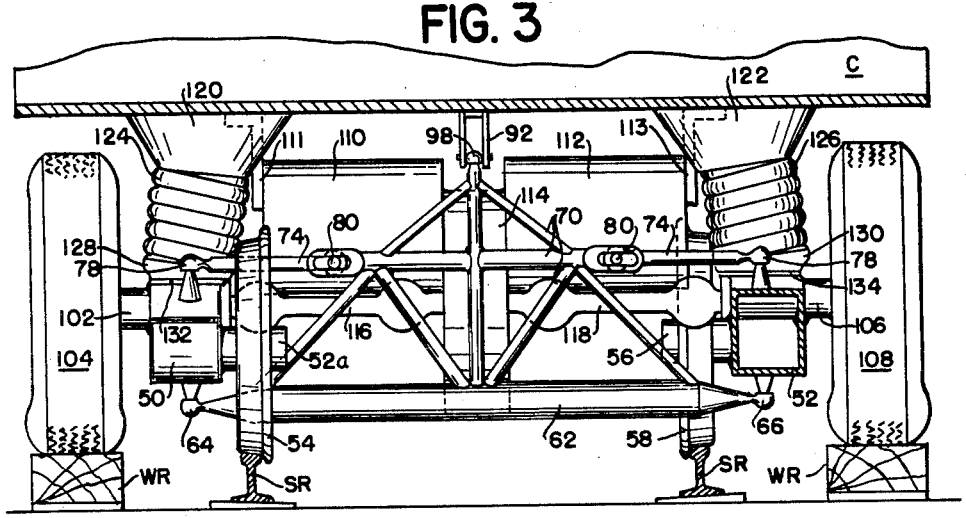
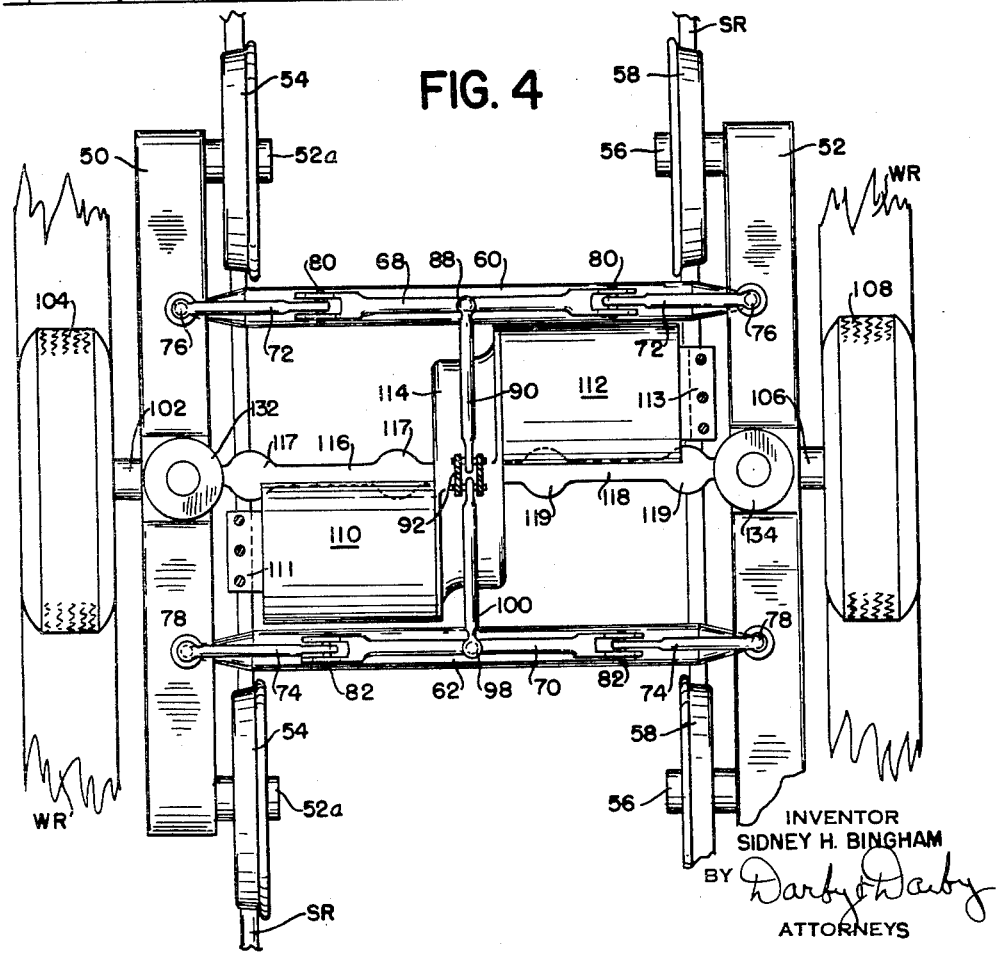
INVENTOR
SIDNEY H. BINGHAM
BY Darby & Darby
ATTORNEYS United States Patent Office 3,120,821
Patented Feb. 11, 1964

3,120,821
TRANSPORTATION TRUCK AND VEHICLE
Sidney H. Bingham, 109 E. 35th St., New York 16, N.Y.
Original application June 30, 1961, Ser. No. 120,998.
Divided and this application Jan. 16, 1963, Ser. No. 251,773
9 Claims. (Cl. 105—215)

This invention relates to light weight powered vehicle trucks of special application for use in railway, freight and passenger cars.

A broad object of the invention is to provide a light weight truck frame assembly with four conventional flanged steel wheels and two additional powered rubber tired wheels running on parallel adjacent tracks to those on which the flanged wheels run.

Another object of the invention is to provide a proportioned suspension system for distributing the car loading between the flanged wheels and the rubber tired wheels.

A further object of the invention is to provide a vehicle powered truck having flanged steel wheels to provide guidance and resistance to side shearing forces in order to take advantage of the established safe and reliable operation with powered rubber tired wheels to take advantage of higher tractive and braking force even though, for example, it is found that one-half the load is carried by the rubber tired wheels.

Still another advantage of this combination is the availability of standard or conventional switching and grade crossing operation.

Still another advantage is to secure lateral stability because of the wider spacing between the rubber tired wheels in reference to the flanged steel wheels, and an advantage highly desirable in modern light weight cars.

A further advantage is that the truck will negotiate the road curves without slip angle for the rubber tired wheels, thereby avoiding drag and wear thereon.

Still another advantage is the increased adherence coefficient of the rubber tired wheels to their rails, the advantage of the crushing forces for snow and ice created by the steel wheels, thereby to insure safe running.

A further advantage of the combination as will appear later is the arrangement wherein the entire load is transferred to the related steel wheels in the event of a tire blow-out when the rubber tired wheels are of the pneumatic type, and in cases where the car is trailed over conventional railway track.

Another advantage, as will appear later, is in the elimination of bevel or hypoid driving gears in the power transmission system.

Still other advantages are higher reliability and lower maintenance of the power transmission system due to the absence of angle gears, as well as a saving in weight.

This application is a division of my copending application Serial No. 120,998, filed June 30, 1961.

In the accompanying drawings, FIGURE 1 is a somewhat diagrammatic side elevational view of a railway car equipped with the novel truck assembly of this disclosure;

FIGURE 3 is an end elevational view of the truck assembly of FIGURE 2; and

FIGURE 4 is a top plan view of the assembly.

Generally speaking, a broad object of this invention is to obtain all the advantages resulting from the addition to a flanged steel wheel supported truck assembly for a vehicle, of powered rubber tired driving wheels, all including a proportioning spring suspension system, whereby the load on the truck assembly is more or less evenly distributed between the steel wheels as a unit and the rubber tired wheels as a unit. Important advantages of this arrangement reside in the fact that the guidance and resistance to wide shearing forces provided by flanged steel wheels are retained in combination with the gain in tractive and braking power due to the adherence coefficient of rubber. For example, if one-half the normal loading for the truck is transferred to the rubber tired wheels, improved tractive effort results from the fact that the adherence coefficient of rubber is at least four times higher than that of steel. Other and more detailed advantages of the invention will be apparent to those skilled in the art.

The car of body C, as is diagrammatically illustrated, can be of any one form common to the transportation industry and any type with respect to the character of goods or persons to be carried. The truck assemblies which are fixed to the underside of the supporting frame of the car adjacent each end thereof are, as shown, provided with two pairs of flanged steel wheels and an intermediate pair of pneumatic tired driving wheels. To provide trackage for this wheel assemblage, as shown, for example, in FIGURE 3, a pair of standard steel rails SR on which the flanged guiding wheels ride. Positioned outside of the steel rails and extending parallel thereto are a pair of wooden rails WR on which the pneumatic tired wheels travel.

The truck assemblies consist of a pair of side frame members 50 and 52 which are respectively provided with stub shafts 52a and 56 at their respective ends on which the flanged steel wheels 54 and 58 are rotatably mounted respectively. These side frame members can be of any suitable specific form and may for example as illustrated comprise hollow castings.

Figure 1:
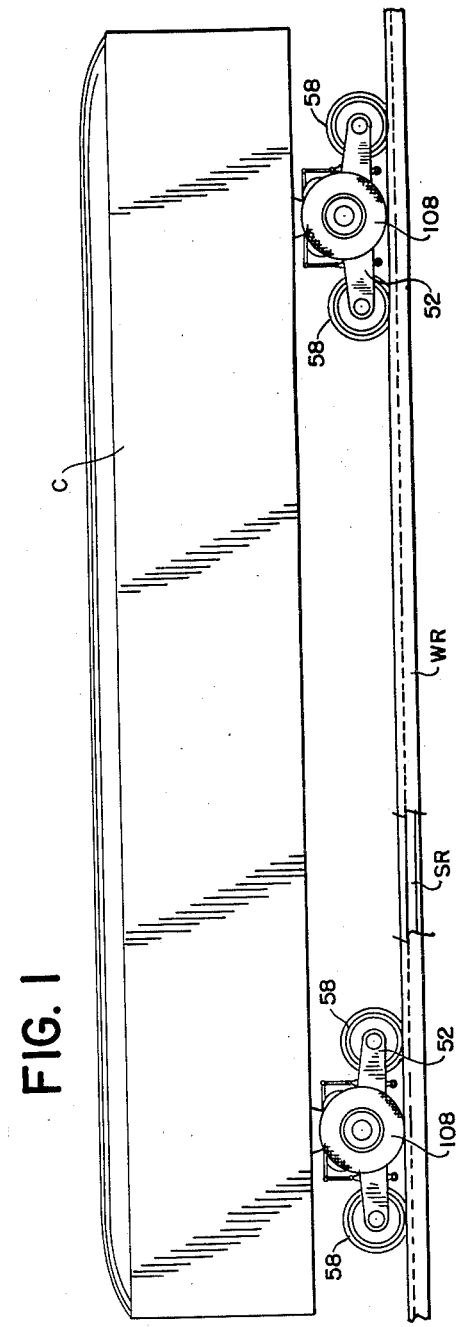
Figure 2:
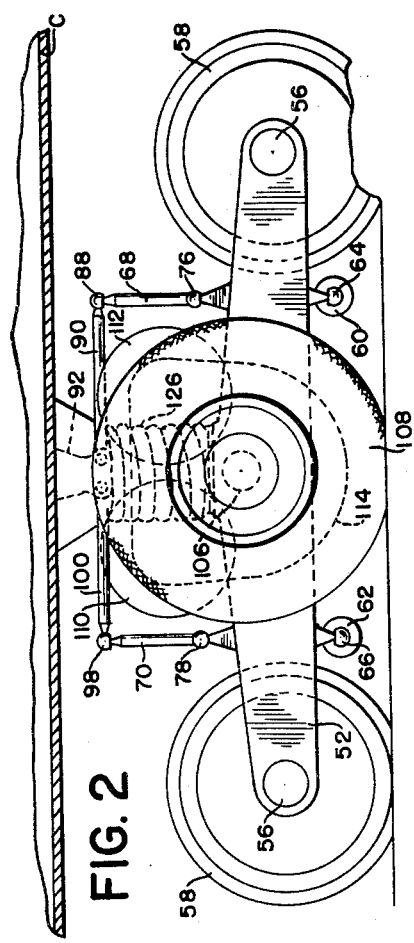
FIGURE 2 is an enlarged side elevational view of one of the truck assemblies showing generally a portion of the vehicle body as a broken fragment.

The side frame members are cross-connected by struts 60 and 62 which are longitudinally spaced with respect to the side frame members. These struts are integral parts of generally rectangular frameworks 68 and 70, respectively. As in the case of the frameworks 70, see FIGURE 3, they are arranged in vertical generally parallel planes, see also FIGURE 4. The struts 60 and 62 of these frameworks are each connected at their ends by ball joint connectors 64 and 66, respectively, which engage downwardly extending brackets on the side frame members, see FIGURES 2 and 3. This connection provides for considerable relative movement between the side frame members and the rectangular frameworks while holding the parts in the generally rectangular relationship, see FIGURE 4.

The ends of the top members of the frameworks 68 and 70 are bifurcated as clearly appears in FIGURE 4, and are respectively connected to the side frame members by means of the links 72 and 74. These links 72 and 74 are attached to the side frame members by ball joint connectors 76 and 78, which engage upwardly extending brackets on the side frame members, see for example FIGURES 2 and 3. The other ends of these links are provided with pins 80 and 82, which have sliding engagement with slots in the bifurcated ends of the upper members of the rectangular frameworks 68 and 70.

The frameworks 68 and 70 terminate in ball joint connectors 88 and 98 which are secured by the links 90 and 100, see FIGURE 4, to a bracket 92 depending from and secured to the bottom framework of the car body C.

At the longitudinal centers of the side frame members 50 and 52 are outwardly projecting stud shafts 102 and 106 on which the rubber tired wheels 104 and 108 are rotatably mounted.

Supported by means of the brackets 111 and 113 likewise secured to the bottom framework of the car C are a pair of electric drive motors 110 and 112. These motors are respectively connected by a power transmission system comprising parallel gears, not shown, enclosed within a suitable housing 114. The gear train for each motor is independent and the output gear of each is connected to the rubber tired wheels 104 and 108 by means of the drive shafts 116 and 118 which are provided at both ends with suitable universal joint connectors 117 and 119 respectively.

Also mounted on the bottom of the car body frame are the side members 120 and 122 for the coiled suspension springs 124 and 126, respectively. These springs rest at their respective lower ends on the fixtures 128 and 130 which form part of the turning bearings 132 and 134 on the tops of the side frame members 50 and 52.

It is apparent that the truck structure is of a highly articulated nature with all of the parts interconnected by universal or ball joint connections, so as to provide great flexibility with adequate strength in what amounts to the truck frame. The guidance and relative positioning of the parts is maintained by the engagement of the steel flange wheels with the rails SR. As in the previous case, the power is applied to the rubber tired driving wheels 104 and 108 which ride on special outboard tracks WR. One advantage of this arrangement is the simple parallel gear transmissions centrally mounted. This arrangement, as in the previous case, avoids the use of angle gears such as bevel and hypoid gears.

As can best be appreciated from FIG. 3, it is apparent that if rubber tired wheels are provided with pneumatic tires and if one or more of them becomes deflated, the related side frame member can drop a limited distance by reason of the slip joints provided in the bifurcated ends of the frame members in which the pins 80 and 82 slide. This in effect permits the load which was being carried by the deflated wheels to be transferred to the related steel wheels. This arrangement is particularly important when the car is trailed on a conventional track, in which case the outboard rails WR are not present. Under these conditions the rubber tired wheels even if not deflated, are permitted to drop a short distance determined by the length of the slots in the bifurcated ends of the frame members. Thus the car may be trailed on a standard track system without requiring any alteration or mechanical adjustment of the truck structure. The fore and aft links 98 and 100 give lateral stability to the truck and absorb the longitudinal forces arising from tractive and braking efforts.

From the above description it will be apparent to those skilled in the art that the structure herein disclosed for purposes of illustration can be modified in detail without destroying the novel structural and functional relationship of the combination disclosed.

What is claimed is:

1. A truck for a vehicle body comprising a pair of side frame members, pairs of fore and aft flanged wheels journaled on said frame members in longitudinally spaced positions, a pair of rubber tired wheels journaled on said side frame members between said steel wheels, cross-bracing frames and universal joint means for connecting said cross-bracing frames to said side frames, universal joint links extending fore and aft of said side frame members interconnecting said cross frame members with the vehicle body, turning bearings mounted on each of said side frame members and vehicle body supporting springs mounted thereon.

2. In the combination of claim 1, a pair of drive motors and power transmission means interconnecting said motors respectively with said rubber tired wheels.

3. A combination as disclosed comprising a vehicle car body and a wheeled truck for said body comprising a pair of side frame members vertically positioned fore and aft, cross-bracing frames connected at their respective ends to said side frame members with universal joint connectors, universal joint means for connecting said frames respectively with the car body, pairs of fore and aft steel wheels journaled on said side frame members, and a pair of rubber tired load supporting wheels journaled on said side frame members respectively.

4. In the combination of claim 3, a pair of drive motors and power transmission means including parallel gear trains for interconnecting said motors with said rubber tired wheels respectively.

5. In the combination of claim 4, the turning bearings supported on said side frame members in axial alignment with said rubber tired wheels and supporting springs interposed between said vehicle body and said turning bearings.

6. In the combination of claim 4, said rubber tired wheels having pneumatic tires, a pair of links connected to the top of said side frame members in alignment with said cross frame members, and a sliding connection between said links and said cross frame members whereby the downward movement of said rubber tired wheels when the load carried by said rubber tired wheels is shifted to said flanged wheels is limited.

7. In combination a vehicle chassis and a pair of truck assemblies supporting it at each end, each assembly comprising a pair of side frames, two pairs of flanged wheels individually journaled on said side frames respectively, a pair of transverse links pivotally connected at their ends to said side frames at longitudinally spaced points, a rubber tired wheel journaled on each side frame intermediate each pair of fore and aft flanged wheels and spring suspension means connecting each side frame to said chassis, whereby each side frame can shift individually in a vertical plane.

8. In the combination of claim 7, pairs of fore and aft drag links interconnecting said side frames to said chassis.

9. In the combination of claim 7, means for limiting the pivotal movement of said side frames.

References Cited in the file of this patent
UNITED STATES PATENTS

| | | |
|---|---|---|
| 2,478,647 | Watts et al. | Aug. 9, 1949 |
| 3,010,411 | Peras | Nov. 28, 1961 |